C. B. BEALL & J. K. LEACH.
Improvement in Planing-Machines.
No. 128,007. Patented June 18, 1872.
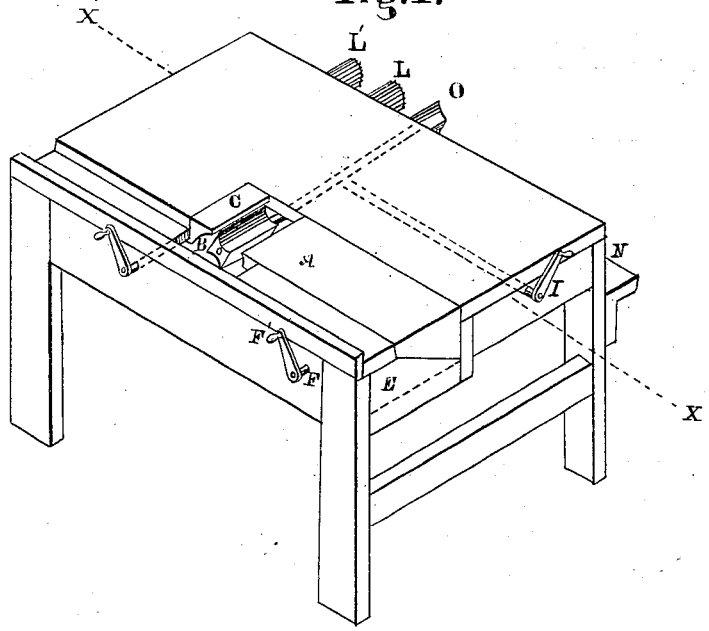
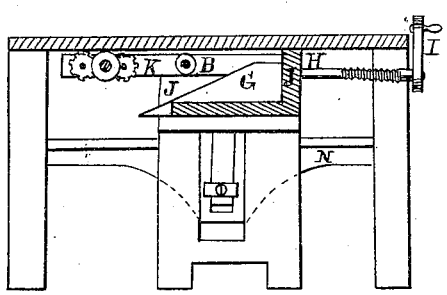
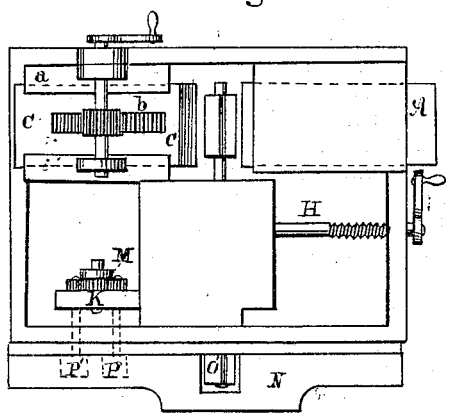
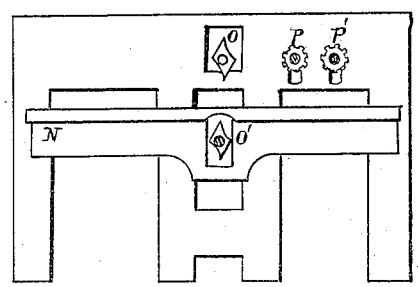

128,007

UNITED STATES PATENT OFFICE.

CHARLES B. BEALL AND JOHN K. LEACH, OF HAMILTON, OHIO, ASSIGNORS OF ONE-THIRD OF THEIR RIGHT TO J. E. HULL, OF SAME PLACE.

IMPROVEMENT IN PLANING-MACHINES.

Specification forming part of Letters Patent No. 128,007, dated June 18, 1872.

We, CHARLES B. BEALL and JOHN K. LEACH, of Hamilton, in the county of Butler and State of Ohio, have invented certain new and useful Improvements in Planing-Machines, of which the following is a specification, reference being made to the accompanying drawing hereto annexed.

Our joint invention consists in several devices, to be more specifically hereinafter described, for adjusting the mandrels of a woodworking table to the use of different-sized cutter-heads, and for elevating and depressing a slide or platform, whereby cuts of different depths may be made with the same-sized cutter-heads.

Our devices and the arrangement thereof permit the table-bed to be cast in one solid piece, thus securing cheapness, strength, and durability to an extent not attainable in the present construction of such table.

In the accompanying drawing forming part of this specification, Figure 1 is a view in perspective of a wood-working table embodying our improvements. Fig. 2 is a vertical longitudinal section thereof through the lines X X of Fig. 1. Fig. 3 is a bottom view of the table; and Fig. 4 is a view of that side of the table which supports an additional platform for molding, grooving, and tenoning purposes.

A is the adjustable slide upon which the timber is placed before passing it over the cutter-head fixed on the mandrel B. On the opposite side of the cutter-head, at an exact level with it, except when grooving, and sliding in flanges $a\ a'$ cast on the bottom of the table-bed, is a movable nose, operated by a rack-bar, $b$, and pinion $c$, to adjust it to the different sizes of the cutter-heads. The function of this nose is to close up the space intervening between it and the slide A, and thereby prevent the wood from tilting in its passage over the cutter-head. The slide A, having its under side beveled, is elevated or depressed by means of a movable wedge, E, (shown by dotted lines in Fig. 1,) which is operated by a screw, F, and crank F'. The mandrel B is supported in a frame, J, which is elevated or depressed by wedge G, screw H, and crank I, in the same manner as the slide A above described. An arm, K, projects from this frame and supports two feed-rolls, L L', which are operated by a pinion, M, to which motion is communicated from the mandrel B by means of a belt or otherwise. On one side of the machine, Fig. 4, is an additional platform, N, for grooving, molding, and tenoning wood, the devices heretofore described being more particularly adapted to planing and similar work. O is a cutter on the end of the mandrel B, co-operating with the cutter O', located beneath the platform N, to form a tenon on the wood placed upon said platform, and fed to the cutters by the feed-rolls L L', which latter, being supported by the arm K, as above described, are adjusted in unison with the cutter O on the mandrel B by means of the wedge G.

The object of elevating and depressing the slide A is to cause the wood to feed heavier on the cutter. The same motion is applied to the mandrel B to allow of the use of different-sized cutter-heads, which are never beneath a level with the nose C, or to adjust the feed-rolls L L', and with them the cutter-head O, to the desired position.

What we claim as new is—

1. The independent nose-piece C, operated by a rack and pinion on a wood-working table, substantially as and for the purpose set forth.

2. The combination of slide A, nose-piece C, and mandrel B with a wood-working table, substantially as and for the purpose set forth.

3. The combination of the arm K, feed-rolls L L', cutter O', mandrel B, screw H, and crank I, or its equivalent, substantially as and for the purpose set forth.

4. The combination of wedge E, slide A, wedge G, and mandrel B on a wood-working table, substantially as and for the purposes set forth.

CHAS. B. BEALL.
J. K. LEACH.

Witnesses:
JEREMIAH TWOHIG,
P. M. SHUEY.